United States Patent
Nemeth

(10) Patent No.: US 8,910,652 B2
(45) Date of Patent: Dec. 16, 2014

(54) FUEL VENTILATION SYSTEM VALVE

(71) Applicant: Volvo Car Corporation, Goeteborg (SE)

(72) Inventor: Christoffer Nemeth, Bollebygd (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 13/724,521

(22) Filed: Dec. 21, 2012

(65) Prior Publication Data

US 2013/0160867 A1 Jun. 27, 2013

(30) Foreign Application Priority Data

Dec. 22, 2011 (EP) .................................. 11195372

(51) Int. Cl.
*B60K 15/035* (2006.01)

(52) U.S. Cl.
CPC ......... *B60K 15/035* (2013.01); *B60K 15/03504* (2013.01); *B60K 15/03519* (2013.01)
USPC ............................................ 137/202; 137/43

(58) Field of Classification Search
USPC ................................ 137/38, 39, 43, 202, 587
See application file for complete search history.

(56) References Cited

U.S. PATENT DOCUMENTS

| 5,028,244 | A | * | 7/1991 | Szlaga | 137/202 |
| 5,582,198 | A | * | 12/1996 | Nagino et al. | 137/43 |
| 5,860,458 | A | * | 1/1999 | Benjey et al. | 137/202 |
| 6,557,578 | B2 | * | 5/2003 | Shimamura et al. | 137/202 |
| 6,691,725 | B2 | * | 2/2004 | Zorine | 137/202 |
| 6,708,713 | B1 | * | 3/2004 | Gericke | 137/43 |
| 6,840,262 | B2 | * | 1/2005 | Kojima | 137/202 |
| 7,219,683 | B2 | * | 5/2007 | Furuya et al. | 137/202 |
| 8,286,658 | B2 | * | 10/2012 | Devall | 137/43 |
| 2004/0055638 | A1 | * | 3/2004 | Yamada et al. | 137/202 |
| 2005/0092364 | A1 | * | 5/2005 | Furuya et al. | 137/202 |
| 2006/0231138 | A1 |   | 10/2006 | Devall | |
| 2006/0283501 | A1 | * | 12/2006 | Devall | 137/43 |
| 2009/0199908 | A1 | * | 8/2009 | Arnalsteen et al. | 137/202 |

OTHER PUBLICATIONS

Extended European Search Report Dated Dec. 17, 2012, Applicant Volvo Car Corporation, Application No. 11195372.5-2421, 4 Pages.

* cited by examiner

*Primary Examiner* — Craig Schneider
*Assistant Examiner* — Craig J Price
(74) *Attorney, Agent, or Firm* — Brooks Kushman P.C.

(57) ABSTRACT

A fuel system vent valve comprises a housing with a first opening, and a float inside the housing. The float is movable between a first position in which the valve is open and a second position in which the float covers the first opening such that the valve is closed. The valve further comprises a liquid trap arranged above the housing such that it covers the first opening. The liquid trap comprises a housing in which is arranged a perimeter wall surrounding the first opening, the perimeter wall being arranged at a distance from the liquid trap housing thereby creating a first volume inside the wall and a second volume outside the wall. The first volume is larger than the second volume and the two volumes are connected via at least one gap between a top of the wall and a top of the liquid trap housing.

17 Claims, 3 Drawing Sheets

FUEL VENTILATION SYSTEM VALVE

CROSS-REFERENCE TO RELATED APPLICATIONS

This application claims foreign priority benefits under 35 U.S.C. §119(a)-(d) to European patent application number EP 11195372.5, filed Dec. 22, 2011, which is incorporated by reference in its entirety.

TECHNICAL FIELD

The present disclosure relates to a fuel system vent valve comprising a housing with a first opening in the upper part of the housing and a float inside the housing, wherein the float is movable between a first position in which the valve is open and a second position in which said float covers said opening such that the valve is closed.

BACKGROUND

Some vehicles are hard/slow to fill with fuel. The general indication is that when re-fuelling, the gas pump shuts off repetitively after only adding a minor volume of gas. The fuel seems to back up into the fill tube, causing the automatic shut off on the pump to activate. The fuel gradually subsides in the filler neck, and some more gas can be added before shutting off again.

There are two general possibilities which would cause the issue: a restriction directly preventing fuel from entering the tank, or a restriction preventing vapours from exiting the tank and thus not allow fuel to enter. All cars built from 1999 onward have had included an onboard fuelling vapour recovery system. Simplified this means that fumes from the entire fuel system are no longer vented to the outdoors, but are instead re-cycled through the vehicle air intake system.

Things that can prevent proper venting include blockages anywhere in the onboard vapour recovery system such as for instance a blocked leak detection pump outlet, restricted charcoal canister filter, or a restricted charcoal canister itself by liquid fuel in canister.

One possible cause of blockage in the venting system is from fuel entering the vapour, vent lines and directly into the charcoal canister. The liquid gasoline gets absorbed by the charcoal in the canister, causing it to swell and it blocks off the vapour vent lines. A clogged canister filter may prevent one from filling up with gas, since the gas tank contains both fuel and air. As the tank is filled up, the gasoline displaces the air, and the air has to escape somehow. But the air that is displaced is full of fuel vapour.

Being harmful to the atmosphere, fuel vapour can't just be vented directly into the air, so the vapour recovery system is set up to capture these vapours through a series of vent lines that lead to a box full of charcoal, which absorbs the gas vapours. When the gas-soaked charcoal swells and blocks off the vent lines, it is preventing the air from escaping the tank. In order to put gas in, the air has to have some way of getting out, and the only way for it to get out is through the vent lines. Common solutions involve replacing one of the components in the fuel vapour recovery system. (one way valve in the tank, vent valve in the tank, liquid-vapour separator near the tank, carbon canister or canister close valve.) The most common first choice for repair is the canister, but the other components may well be plugged.

Under specific circumstances a fuel vent valve might leak. Vehicles with an internal combustion engine are generally equipped with a system that checks whether or not the venting systems leak. They may also be equipped with an evaporative system that purges the canister during driving. These checks include pressurizing the system and the purging of the canister is normally performed when the engine is running If a leakage diagnose check is performed when the fuel tank is full and/or the vehicle is tilted when not full, liquid fuel might pass the fuel vent valve and flow on to clog up the canister.

FIG. 1 shows a standard fuel vent valve 1 in a closed position where a float 2 with a sealing 3 is lifted up to close the opening 4. A part 5 of the valve housing has openings to allow for liquid to pass through. During a "leak" check or when purging the canister the float 2 might be made to oscillate and if the valve 1 at the same time with a liquid level relative to vent valve shut off point, e.g., is being on the border to close (seal), the valve might leak and let liquid fuel into the vent system 6 and further on to the canister. The canister (not shown) can handle vapour but not liquid.

SUMMARY

An object of the present disclosure is to provide a fuel system vent valve that at least alleviates the problems with prior art.

According to the present disclosure a fuel system vent valve comprises a housing with a first opening in the upper part of the housing and a float inside the housing, wherein the float is movable between a first position in which the valve is open and a second position in which said float covers said opening such that the valve is closed, the housing further comprises several openings at least on the side of the housing. The valve further comprises a liquid trap arranged above said housing such that it covers said first opening, the liquid trap comprising a housing in which is arranged a perimeter wall surrounding said first opening, the perimeter wall being arranged at a distance from the housing of the liquid trap thereby creating a first volume inside the walls and a second volume outside the walls, wherein the first volume is larger than the second volume and the two volumes are connected via at least one gap between the top of the wall and the top of the liquid trap housing, the housing of the liquid trap further comprising an outlet opening in direct connection with said second volume.

The amount of liquid that leaks into the vent system under the above mentioned circumstances is not generally particularly high and by arranging a buffer volume above the valve seat the problem of getting liquid fuel in the vent system can be avoided for most cases.

According to one aspect of the present disclosure a spring is arranged underneath the float acting against the bottom of the float housing. The spring helps closing the valve even when the vehicle/valve is tilted.

According to another aspect of the present disclosure the liquid trap housing has a second opening. This opening is a so called roll over access hole. Depending on fuel tank shape and venting requirement the number of access holes for rollover valves may vary. The main purpose of roll over valves is to prevent fuel from being drained in a vehicle rollover situation and to allow fuel tank inner venting if vehicle is tilted.

According to yet another aspect of the present disclosure a second perimeter wall is arranged inside said first volume, the second wall having at least one opening adjacent the housing of the float. An advantage is that the fuel if any will have a more limited space and if the amount is small enough to fit into this smaller volume, the fuel will more easily return back into the fuel tank. In order for this to function optimally the area of the at least one opening in the second perimeter wall should be smaller than the cross section area provided by the second perimeter wall.

The outlet opening is according to a further aspect of the present disclosure arranged somewhere on the side of the liquid trap housing or on the topside. For avoiding liquid fuel in the vent system it would of course be better if the outlet opening was arranged on the top of the housing for allowing for maximum buffer volume. However, packaging space in modern vehicles is limited and therefore often restricts the position of the outlet opening.

Preferably, the fuel system vent valve is cylindrical. It is easier to produce a circular hole in the tank and thus the cost is minimized. The same also goes for the float which also preferably is cylindrical. The float being cylindrical also ensures that the function of the valve independently of the tilting angle of the vehicle/valve.

According to yet a further aspect of the present disclosure the float comprises two parts, the two parts being movable relative each other along the axis. They should be movable axially relative one another such that there is pressure relief delay function. This helps to minimize the effects of a possible oscillation of the float. This type of float is sometimes called a two step float as compared to a standard float, e.g., a one step float.

BRIEF DESCRIPTION OF THE DRAWINGS

Embodiments according to the present disclosure will now be further disclosed with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
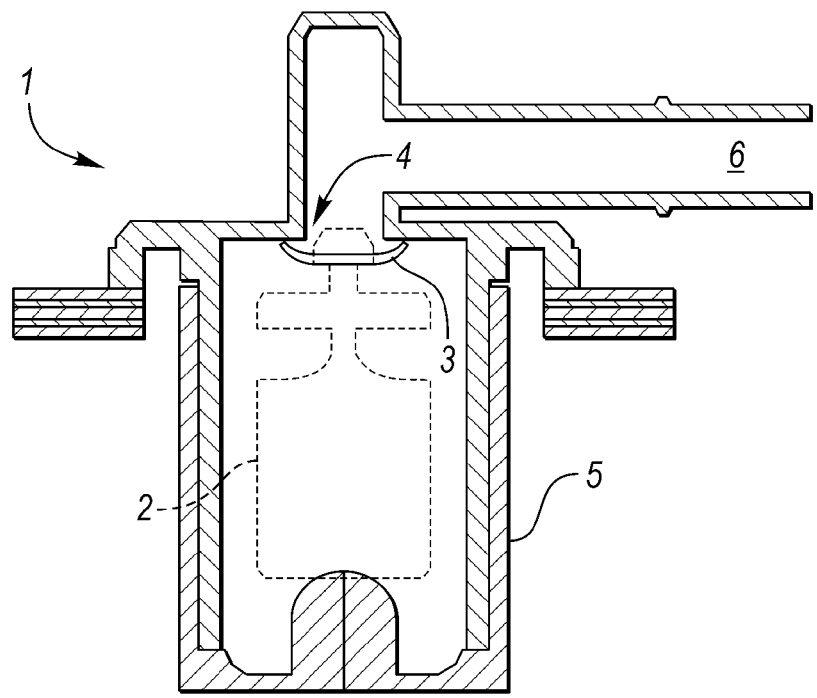
FIG. 1 shows a prior art fuel system vent valve in partial cross section.
Figure 2:
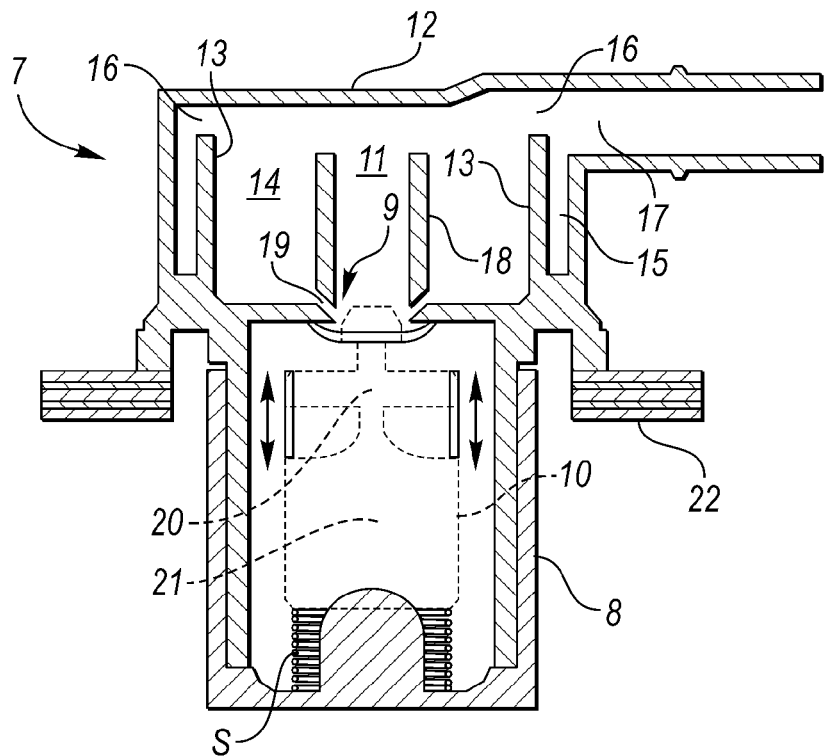
FIG. 2 shows a fuel system vent valve according to the present disclosure in partial cross section.
Figure 5:
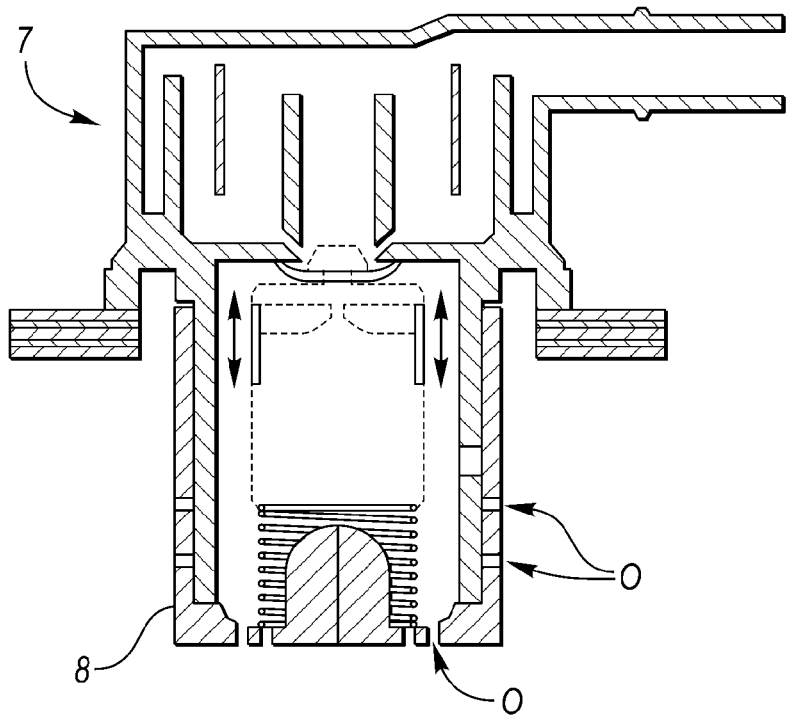
FIG. 5 is a view similar to FIG. 2, showing openings formed in a housing of the valve.
Figure 6:
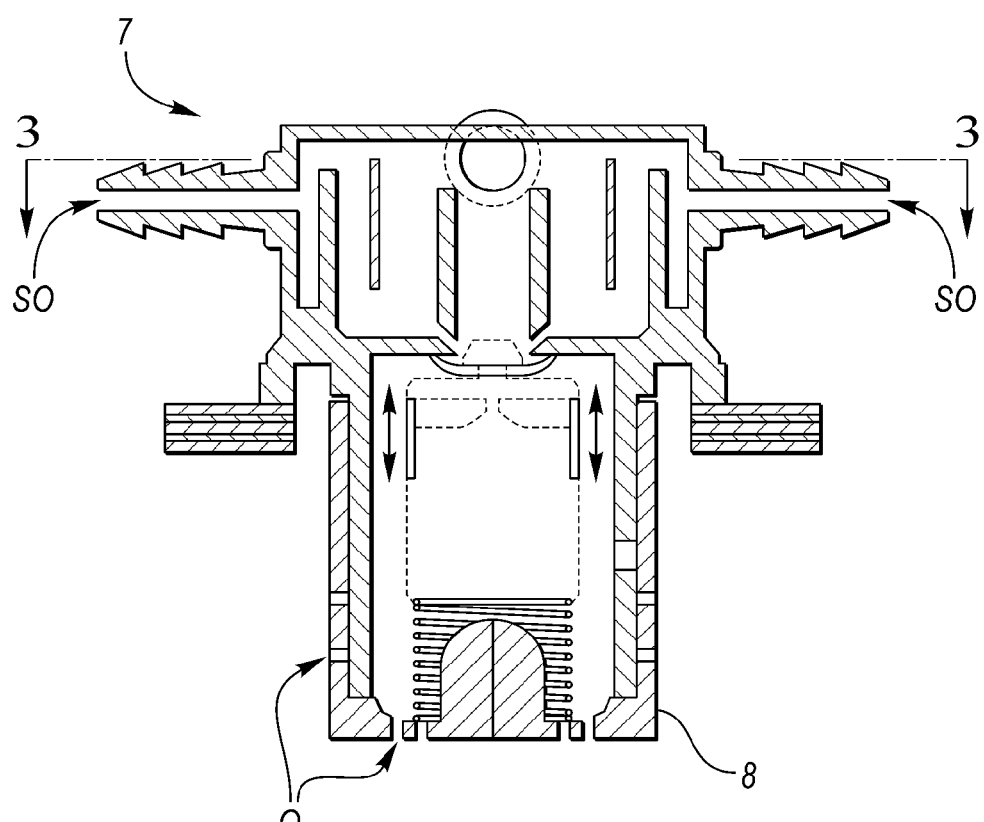
FIG. 6 is a view similar to FIG. 5, but rotated 90 degrees about a vertical axis.

As can be seen in FIG. 2, a fuel system vent valve 7 according to the present disclosure comprises a housing 8 with a first opening 9 in the upper part of the housing 8 and a float 10 inside the housing 8. The float 10 is movable between a first position in which the valve 7 is open and a second position in which said float 10 covers said opening 9 such that the valve 7 is closed as shown in FIG. 2. The housing 8 further comprises several openings O (shown in FIGS. 5 and 6) at least on the side of the housing 8 in order for fuel to be able to enter/drain from the housing 8. The valve 7 further comprises a liquid trap 11 arranged above said housing 8 such that it covers said first opening 9. The liquid trap 11 comprises its own housing 12 in which is arranged a perimeter wall 13 surrounding said first opening 9. The perimeter wall 13 is arranged at a distance from the housing 12 of the liquid trap 11 thereby creating a first volume 14 inside the wall 13 and a second volume 15 outside the wall 13. The first volume 14 is larger than the second volume 15 and the two volumes are connected via at least one gap 16 between the top of the wall 13 and the top of the liquid trap housing 12. The housing 12 of the liquid trap 11 further comprises an outlet opening 17 in direct connection with said second volume 15, and may also include one or more second openings SO (shown in FIG. 6).

Figure 3:
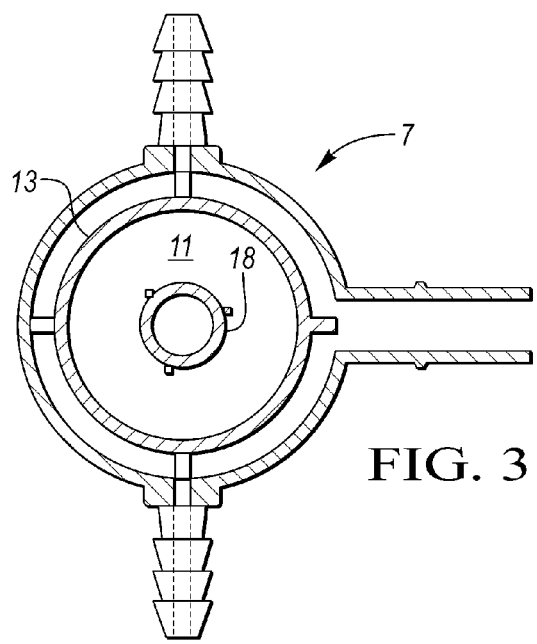
FIG. 3 is a top view of a fuel system vent valve according to the present disclosure.

A second perimeter wall 18 can also be seen in FIG. 2 (and FIG. 3) that is arranged inside said first volume 14. The second wall 18 has at least one opening 19 adjacent the housing 8 of the float 10. As also can be seen the area of the at least one opening 19 in the second perimeter wall 18 is smaller than the cross section area provided by the second perimeter wall 18. The outlet opening 17 is arranged on the side of the liquid trap housing 12.

In FIG. 2 it is shown that the float 10 comprises two parts 20, 21. The two parts are axially movable relative each other. Furthermore, a spring S is arranged underneath the float 10 acting against the bottom of the housing 8. The spring S helps closing the valve even when the vehicle/valve is tilted.

Figure 4:
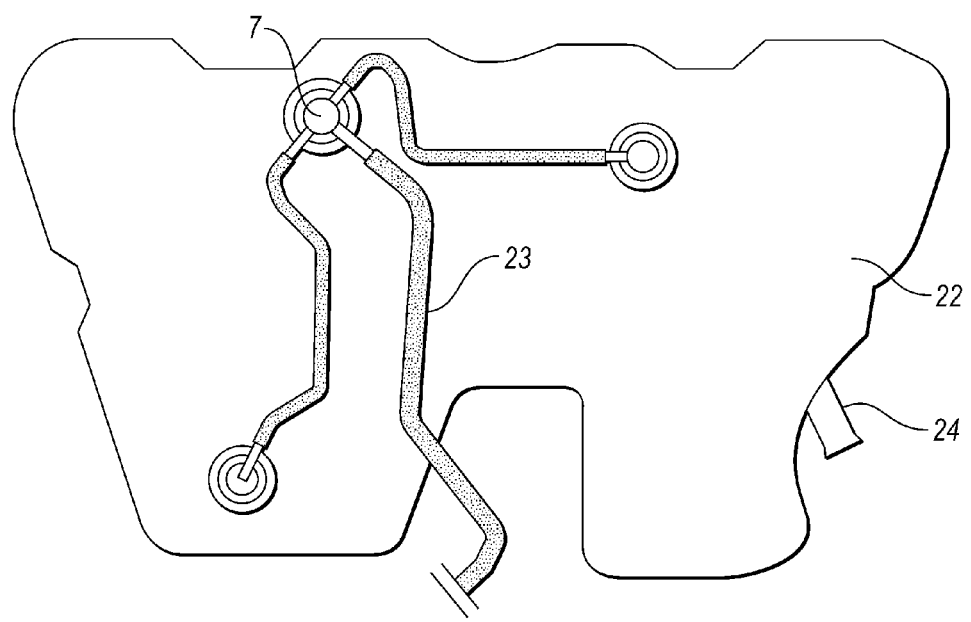
FIG. 4 is a top view of a tank with fuel system vent valve according to the present disclosure.

FIG. 4 shows a tank 22 with a fuel system vent valve 7. The pipe 23 leading to the canister (not shown) can be seen as well as part of the fill tube 24.

The foregoing is a disclosure of an example practicing the present invention. However, it is apparent that incorporating modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims. For instance, the opening 17 is in the embodiment shown in FIG. 2 arranged relatively high. If space available in the vehicle is very limited the opening could be arranged higher or lower on the liquid trap housing 12. Further, the layout of the valve is dependent of the valve position and orientation in the tank. For instance, the perimeter wall 13 is not necessary co-axial with the rest of the valve as shown in the embodiment in the figures. The basic idea is to have an indirect connection between the valve opening 9 and the outlet 17 of the fuel trap housing 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel system vent valve comprising:
   a housing with a first opening in an upper part of the housing and multiple additional openings at least on a side of the housing;
   a float inside the housing, wherein the float is movable between a first position in which the valve is open and a second position in which the float covers the first opening such that the valve is closed; and
   a liquid trap arranged above the housing such that the liquid trap covers the first opening, the liquid trap comprising a liquid trap housing in which is arranged a first perimeter wall surrounding the first opening, the first perimeter wall being arranged at a distance from the liquid trap housing thereby creating a first volume inside the first perimeter wall and a second volume outside the first perimeter wall, wherein the first volume is larger than the second volume and the two volumes are connected via at least one gap between a top of the first perimeter wall and a top of the liquid trap housing, the liquid trap housing further comprising an outlet opening in direct connection with the second volume, and wherein the liquid trap further comprises a second perimeter wall arranged inside the first volume, the second perimeter wall having at least one opening adjacent the housing in which the float is arranged.

2. A fuel system vent valve according to claim 1 further comprising a spring arranged underneath the float acting against a bottom of the housing in which the float is arranged.

3. A fuel system vent valve according to claim 1 wherein the liquid trap housing has a second opening.

4. A fuel system vent valve according to claim 1 wherein an area of the at least one opening in the second perimeter wall is smaller than an area defined by the second perimeter wall in cross section.

5. A fuel system vent valve according to claim 1 wherein the outlet opening is arranged on a side of the liquid trap housing.

6. A fuel system vent valve according to claim 1 wherein the fuel system vent valve is cylindrical.

7. A fuel system vent valve according to claim 1 wherein the float is cylindrical.

8. A fuel system vent valve according to claim 7 wherein the float comprises two parts, the two parts being axially movable relative to each other.

9. The fuel system vent valve according to claim 1 wherein the second perimeter wall extends upwardly, and the at least one opening of the second perimeter wall is formed in a bottom portion of the second perimeter wall.

10. The fuel system vent valve according to claim 9 wherein the at least one opening of the second perimeter wall is disposed adjacent the first opening.

11. A fuel system vent valve comprising: a housing with a first opening in an upper part of the housing;

a float inside the housing, wherein the float is movable between a first position in which the valve is open and a second position in which the float covers the first opening such that the valve is closed; and a liquid trap arranged above the housing such that the liquid trap covers the first opening, the liquid trap comprising a liquid trap housing in which is arranged a first perimeter wall surrounding the first opening, the first perimeter wall being spaced apart from at least a portion of the liquid trap housing thereby defining a first volume inside the first perimeter wall and a second volume outside the first perimeter wall, wherein the first volume is larger than the second volume and the two volumes are connected via at least one gap between a top of the first perimeter wall and a top of the liquid trap housing, the liquid trap housing further comprising an outlet opening in direct connection with the second volume, and wherein the liquid trap further comprises a second perimeter wall arranged inside the first volume, the second perimeter wall having at least one opening adjacent the housing in which the float is arranged.

12. A fuel system vent valve according to claim 11 wherein the outlet opening is arranged on a side of the liquid trap housing.

13. A fuel system vent valve according to claim 11 wherein the fuel system vent valve is cylindrical.

14. A fuel system vent valve according to claim 11 wherein the float is cylindrical.

15. A fuel system vent valve according to claim 11 wherein the float comprises two parts that are axially movable relative to each other.

16. The fuel system vent valve according to claim 11 wherein the second perimeter wall extends upwardly, and the at least one opening of the second perimeter wall is formed in a bottom portion of the second perimeter wall.

17. The fuel system vent valve according to claim 16 wherein the at least one opening of the second perimeter wall is disposed adjacent the first opening.

\* \* \* \* \*